March 9, 1937.  B. J. HASKINS  2,072,984
MEANS FOR LOCATING ENGINE DEAD CENTERS
Filed March 3, 1934  2 Sheets-Sheet 1
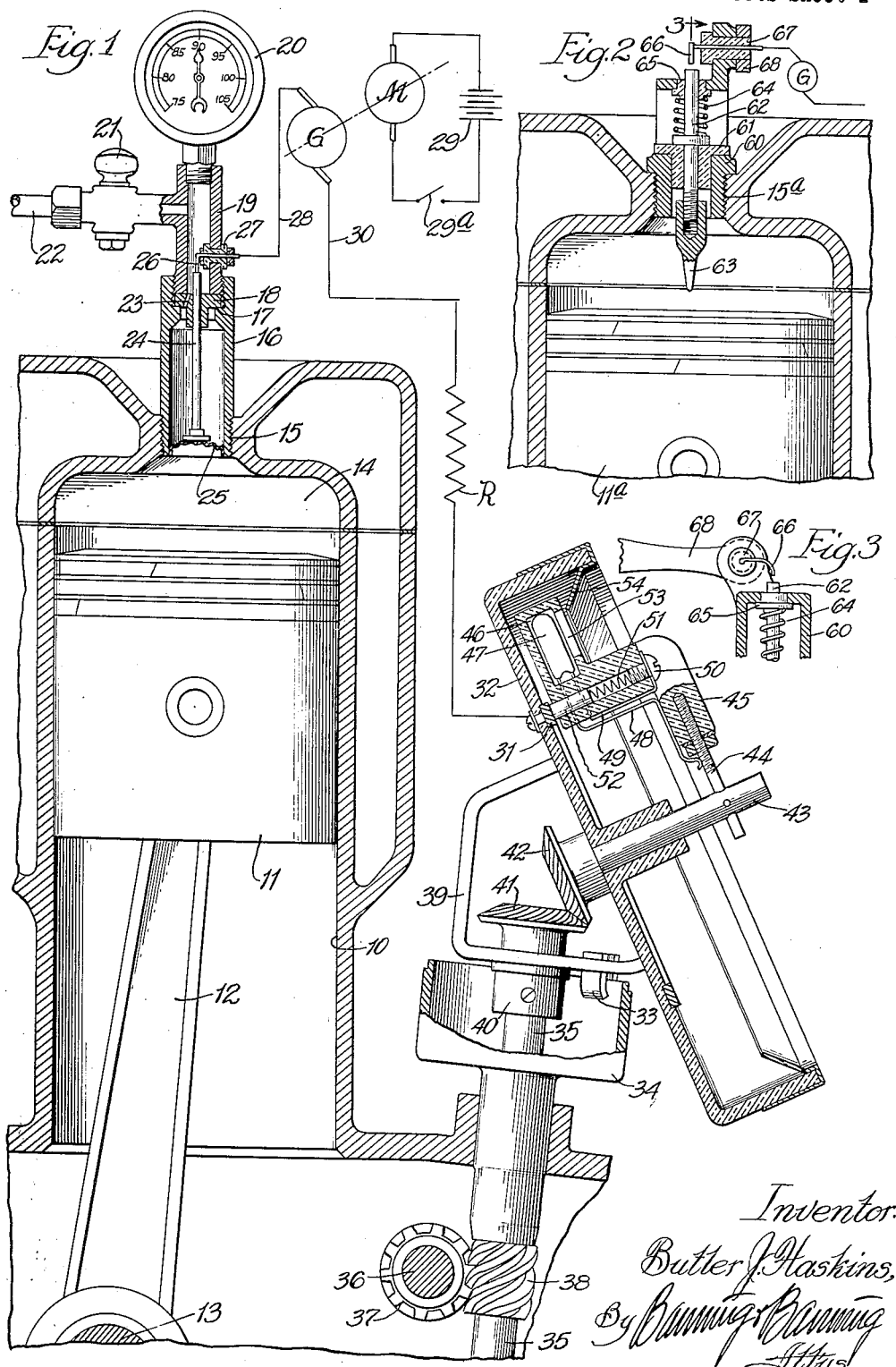

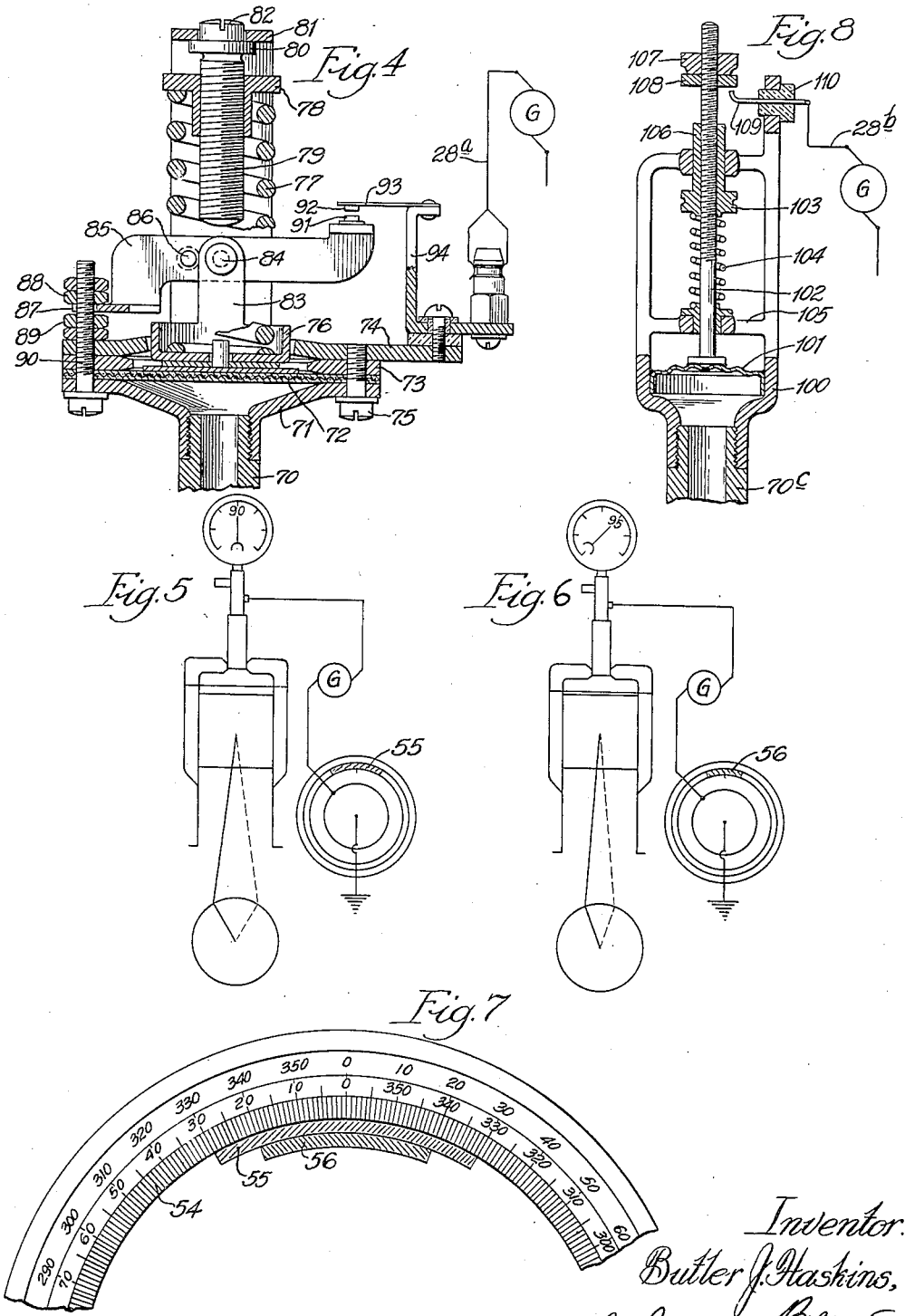

Patented Mar. 9, 1937

2,072,984

UNITED STATES PATENT OFFICE 2,072,984

MEANS FOR LOCATING ENGINE DEAD-CENTERS

Butler J. Haskins, Chicago, Ill., assignor to Joseph Weidenhoff, Inc., Chicago, Ill., a corporation of Illinois Application March 3, 1934, Serial No. 713,955

9 Claims. (Cl. 177—311)

An object of this invention is to provide means for locating an automobile engine dead-center, and more particularly with respect to locating the angular relation of the point of dead-center relative to other positions of the engine crank shaft, such as points of opening and closing the valves, points of ignition, etc.

Another object is to provide such a device which can be readily applied to an automobile and which may be operably connected to an engine shaft.

Another object is to provide such a device where the position of dead-center is indicated visually as the engine crank shaft is rotated at a moderate speed.

These and other objects, as will hereinafter appear, are accomplished by this invention which is fully described in the following specification and shown in the accompanying drawings, in which—

Figure 1 is a partial transverse vertical section through the cylinder and distributor of an engine embodying one form of the invention;

Fig. 2 is a similar section through the cylinder of an engine embodying a modified form of the invention;

Fig. 3 is a partial section on the line 3 of Fig. 2;

Fig. 4 shows a modified form of the device of Fig. 1;

Figs. 5 and 6 are diagrammatic views showing the device in operation on the same engine, the device having different degrees of compression;

Fig. 7 is a partial enlarged plan view of the dial of Fig. 1; and

Fig. 8 is a view similar to Fig. 4 showing another modified form.

The embodiment illustrated in Figs. 1, 5 and 6 is shown in connection with an engine having a cylinder 10 in which is slidably mounted a piston 11 which is connected through a connecting rod 12 with the wrist pin 13 of a crank shaft in a well known manner. The engine compression space 14 has a threaded opening 15 into which is screwed a tube 16, the upper portion of which has an annular shoulder 17 against which is pressed a shouldered guide 18 made of fiber, or other suitable insulating material. This guide is held in place by means of a hollow fitting 19 adapted to receive a pressure gauge 20, and having a plug valve or the like 21 for controlling communication of the fitting through a pipe 22 with a suitable source of air pressure, not shown. The guide 18 has a passage 23 leading to the tube 16 and is provided with a central opening in which is guided a metal rod 24 which connects at its lower end with a metal diaphragm 25.

A metal electrode 26 passes through the side of the fitting 19 and is secured therein by means of a suitable insulator 27. This electrode connects through a lead 28 to a generator G which is driven by a motor M from a source of current 29 which is preferably the automobile battery, the operation of the motor generator being controlled by a switch 29ª. The generator connects through a lead 30 and a suitable resistor R with a metal slip ring 31 secured within a cup 32, which is adjustably mounted by means of clamps 33 on the lower half of a distributor housing 34, the upper half being temporarily removed. This housing has an engine distributor shaft 35 journaled therein and driven from the timing shaft 36 by means of worm gears 37, 38 in a well known manner.

Attached to the back of the cup 32 is a frame 39 in which is journaled a member 40 adapted to be operatively connected to the upper end of the distributor shaft 35, and carrying a bevel gear 41 which meshes with a bevel gear 42 on a shaft 43 which is journaled in the bottom of the cup 32. The shaft 43 carries a metal arm 44 on which is mounted an insulating body 45 which has a chamber 46 in which is secured a neon tube or the like 47 having an electrode 48 which makes electrical contact with the arm 44, and another electrode 49 which passes under a metal screw 50 and through this makes contact with a spring 51 which bears upon a flat metal spring 52, one end of which forms a brush which makes contact with the slip ring 31 as the shaft 43 rotates.

It will be seen from the foregoing that as the crank shaft is rotated by the engine starter, the piston will be moved up and down in the cylinder thereby compressing a charge on each alternate upward movement of the piston. As the pressure within the compression space 14 becomes higher than that above the diaphragm 25, the diaphragm will be lifted thereby causing the rod 24 to make contact with the metal electrode 26, closing the circuit through the generator, the lead 30, the slip ring 41, the brush 52, the electrode 49, the neon tube 47, the electrode 48, and thence through the engine to the metal diaphragm 25.

In operation, therefore, the switch 29ª is closed thereby starting the motor generator to furnish current to the neon tube 47, which in this instance is preferably a tube adapted to operate on a direct current potential of about 90 volts. With the motor generator in operation and the parts connected, as shown in Fig. 1, the operator steps on the starter thereby causing the crank shaft to be rotated. As it does so the rod 24 will make contact with the electrode 26 for a small portion of a revolution during the compression stroke of the engine, assuming that the air pressure above the diaphragm 25 is maintained at a proper level. Thus if the compression pressure of the compression space 14 is say 100 pounds and the pressure above the diaphragm 25 is 90 pounds, as shown in Fig. 5, the rod 24 and the electrode 26 may make contact for 60°, that is 30° each side of the dead-center. If now the pressure above the diaphragm 25 is increased to 95 pounds, the annular period as measured on the engine crank shaft during which the rod 24 and electrode 26 are in contact will be considerably reduced and may be 40°, that is they may close 20° ahead of dead-center and open 20° after dead-center.

The arm carrying the neon tube will thus be rotated at a fairly rapid rate, and the neon tube will thus be caused to glow for that period during which these members are in contact, with the result that a bright arcuate band will be formed by the neon tube shining through a narrow slit 53 in the top of the chamber 46, and the length of this arc can be read with considerable accuracy on the annular dial 54 which is preferably rotatably mounted on the rim of the cup 32. Thus the dial may be turned so that the two ends of the bright band will be equally distant from the zero point on the scale. This reading can then be checked by changing the pressure within the tube and making a new reading which will be different in length from that previously read, but the two ends of the new bright band should still be substantially equally distant from the zero point. This is shown in Fig. 7 by a band 55 corresponding to the band 55 of Fig. 5 which, as we have previously seen, is 60° in length.

On increasing the pressure above the diaphragm as in Fig. 6 to 95 pounds we get a new bright band 56, and, as shown in Fig. 7, this same band 56 lies 20° each side of the zero point which now accurately marks the dead-center for the cylinder examined. Having accurately set the zero of the scale now at the dead-center of this cylinder the operator can proceed to examine other points with respect to this dead-center in terms of angle of rotation of the crank shaft. Thus the point at which the spark occurs, or the points at which the valves open and close, may be read directly on the scale 54 as measured in degrees before or after dead-center.

In Figs. 2 and 3 is shown a modified form of the device in which the piston 11ᵃ as it rises strikes a finger thereby positively closing a switch for a portion of the movement of the piston near the upper dead-center. This consists of a body 60 adapted to be screwed into the threaded opening 15ᵃ, and having an insulator 61 through which is slidably mounted a plunger 62 having a finger 63 adjustably secured at its lower end, the two being threaded so as to be adjustable.

The plunger 62 is urged toward the down position by means of a spring 64, the spring bearing against an insulator 65. A metal spring 66 is carried in an insulator 67 which is suitably journaled in a portion of the body 60 and is rotatable by means of a handle 68. The outer end of the spring 66 overlies the upper end of the plunger 62 and is adapted to make contact therewith as the plunger is raised. The spring 66, as shown in Fig. 2, is connected to the generator G and from this to the neon tube, as has previously been described for Fig. 1.

The operation of this device is quite similar to that of the device of Fig. 1. With the motor generator in operation the operator steps on the starter switch, thereby cranking the engine by the self-starter. As the piston 11ᵃ rises it strikes the finger 63, lifting the plunger 62 until it makes contact with the spring 66, thereby passing current through the neon tube which is rotated, as has been previously described. The bright arcuate band produced by the movement of the neon tube is then read on the scale as in Fig. 1. The spring 66 can be rotated by means of the handle 68 so as to make this arc longer or shorter, thus permitting a check on the zero point on the graduated scale.

In Fig. 4 is shown another modified form of the device in which the pressure within the compression space operates on a diaphragm which lifts a member to close an electric circuit as in Fig. 1, but in which a spring is used instead of the counterbalancing air pressure of Fig. 1. In this construction a hollow nipple or adapter 70 is adapted to be screwed into the threaded spark plug opening 15 of the cylinder, the adapter being secured to a body 71 to which is secured a flexible diaphragm 72 of any suitable material held in place by means of a link 73, a plate 74, and screws 75.

The diaphragm 72 in this instance is a sheet of rubber and carries a cup 76 upon which bears the lower end of a helical spring 77, the upper end of the spring being carried on a nut 78 through which is threaded an adjusting screw 79, having a shouldered portion 80 bearing against a yoke 81 through which passes the upper end 82 of the screw which is provided with a screw driver slot whereby the screw may be turned. Adjustment of pressure on the diaphragm is obtained by raising and lowering the nut 78.

The cup 76 is provided with ears 83. These ears are provided with trunnions 84 upon which are hingedly mounted the two sides of a U-shaped lever 85, this lever being fulcrumed on pins 86 in the sides of the yoke 81. An extension 87 of the U-shaped lever is positioned between locking nuts 88, 89, and a screw 90 carried by the body 71. An outer end of the U-shaped lever 85 carries a contact 91 which moves up and down in response to movements of the diaphragm 72. Thus when pressure within the compression space increases as the piston nears the top dead-center, the diaphragm is raised against the action of the spring 77 thereby lifting the contact 91. This contact is adapted to make electrical engagement with a contact 92 on a spring arm 93 which is carried by a bracket 94 which is secured to the plate 74. This bracket is insulated from the plate 74 and connects through a lead 28ᵃ with the generator G and the rotatable neon tube assembly of Fig. 1.

The operation of the device of Fig. 4 is very similar to that of Fig. 1, the angle during which electrical engagement is made between the contacts 91, 92, being shown on the graduated dial as indicated in Fig. 7. As the nut 78 is lowered thereby increasing pressure on the diaphragm 72, the angular period of the crank shaft during which the contacts 91, 92 are in engagement becomes shorter. The movable dial may then be turned on the cup 32 as has previously been described until the two ends of the bright band made by the illuminated neon tube lie equally distant on the dial from the zero point.

In Fig. 8 is shown a modified form of the device which is somewhat similar to that of Fig. 4, but which operates upon the suction stroke of the engine and which enables us to locate the lower dead-center of the engine instead of the upper dead-center, as has been previously described. This consists of a body 100 having a screw-threaded opening to receive an adapter 70c which in turn is threaded to be screwed into an opening in the engine cylinder head. Hermetically sealed in the body is a suitable diaphragm 101, to the center of which is secured a metal rod 102 which is screw-threaded to receive an adjusting nut 103.

A compression spring 104 is adjustably held between the adjusting nut 103 and a ledge 105 on the body 100. The nut 103 has a hub 106 which is slidable in the upper portion of the body 100. Lock nuts 107, 108 are adjustably threaded on the upper portion of the rod 102, the nut 108 overlying a metal finger 109 which is held in an insulator 110 in the body. The finger is connected through a lead 28b with the generator G and the rotatable neon tube assembly of Fig. 1. The lower dead-center is then obtained by adjusting the nuts 103, 107 and 108 to get the desired length of neon flash, as has been previously described. This dead-center will be located on the dial 54 ninety degrees in advance of dead-center which has previously been described.

The neon tube here shown is preferably of a small low voltage direct current type readily carried by the indicator.

This method of finding dead-center depends upon the pressure being substantially the same for two points in the arc made by the crank shaft equi-distant from the dead-center. This is true particularly where the crank shaft is rotated at a rate which permits little leakage to take place. The points chosen should not be too close together as the arc is then too flat, and there is too much chance for errors to creep into the readings. By taking arcs of 20° to 30° each side of dead-center, these errors are largely eliminated, and the resulting determination of dead-center is quite accurate.

I claim:

1. In a device for locating the upper dead-center of an automobile engine having a cylinder, a piston slidable therein, a crank shaft, a distributor, and a distributor shaft, said device comprising a stationary member having a graduated dial and having means for securing it to the distributor housing after the distributor cap has been removed, a member rotatable adjacent the dial and having a radial slot, means connecting said rotatable member to the top of the distributor shaft, a neon tube back of the slot, means including an electric circuit, a source of electric energy, and an electric switch having two contacts mounted on said cylinder, means mounted for operation by movement of the piston and connected to one of said contacts for causing said contact to engage the other at a predetermined position of the piston on one side of top dead-center and for causing them to remain in engagement to a corresponding position on the other side of top dead-center for passing current through the neon tube during said predetermined travel of the piston, whereby a bright arc indicates on the dial the angular position of the distributor shaft during said predetermined travel of the piston, and means for adjusting the operating positions of the contacts with respect to the position of said piston and top dead-center.

2. In a device for locating the upper dead-center of an automobile engine having a cylinder, a piston slidable therein, a crank shaft, and a distributor shaft, said device comprising a stationary member, a member rotatable therein and adapted to be operably connected to the distributor shaft so as to be driven thereby, said member having a radial slot, a neon tube back of said slot, means including an electric circuit, a source of electric energy, an electric switch having contacts, and a member lying in the path of the piston and movable thereby, means connecting said last mentioned member to one of the switch contacts to close the contacts and hold them closed for passing current through the neon tube while the piston is within a predetermined distance of its uppermost position, and an arcuate scale adjacent the neon tube, whereby a bright arc indicates the angular position of the distributor shaft during which the piston is within said predetermined distance.

3. In a device for locating the upper dead-center of an automobile engine having a cylinder, a piston slidable therein, a crank shaft, and a distributor shaft, said device comprising a stationary member, a member rotatable therein and adapted to be operably connected to the distributor shaft so as to be driven thereby, said member having a radial slot, a neon tube back of said slot, means including an electric circuit, a source of electric energy, and an electric switch having two contacts mounted on said cylinder, and a member movable by changes in pressure in the upper part of the cylinder and connected to at least one of said contacts to close said contacts and to hold them closed while a predetermined pressure is maintained by travel of the piston from a predetermined position on one side of top dead-center to a corresponding position on the other side of top dead-center for passing current through the neon tube while the piston is within a predetermined distance of its uppermost position, and an arcuate scale adjacent the neon tube, whereby a bright arc indicates the angular position of the distributor shaft during which the piston is within said predetermined distance.

4. In a device for locating the upper dead-center of an automobile engine having a cylinder, a piston slidable therein, a crank shaft, and a distributor shaft, said device comprising a stationary member, a member rotatable therein and having means connecting said member to the distributor shaft so as to be driven thereby, said member having a radial slot, a neon tube back of said slot, means including an electric circuit, a source of electric energy, and an electric switch having two contacts mounted on said cylinder, and a diaphragm having one side in communication with the compression space in the cylinder and having means connected to one of the contacts so that a predetermined compression pressure will cause the contacts to close and to stay closed so long as the pressure is maintained, yieldable means for opposing said pressure for causing one of the contacts to engage the other at a predetermined position of the piston on one side of top dead-center and for causing them to remain in engagement to a corresponding position on the other side of dead-center for passing current through the neon tube while the piston is within a predetermined distance of its uppermost position, and an arcuate scale adjacent the neon tube, whereby a bright arc indicates the angular position of the distributor shaft during which the piston is within said predetermned distance.

5. In a device for locating the upper dead-center of an automobile engine having a cylinder, a piston slidable therein, a crank shaft, and a distributor shaft, said device comprising a stationary member, a member mounted for rotation relative to said stationary member, means connecting said member to a shaft of said engine to be driven thereby, said member having a slot, a gaseous discharge tube mounted back of the slot in said member, means for energizing said tube including an electric circuit, a source of electric energy and an electric switch in said circuit, means associated with said piston and switch for operating said switch while the piston is within a predetermined distance of its uppermost position, and a scale mounted adjacent said tube, whereby a bright arc is produced adjacent said scale when said piston is within said predetermined distance of its uppermost position.

6. In a device for locating the upper dead-center of an automobile engine having a cylinder, a piston slidable therein, a crank shaft, and a distributor shaft, said device comprising a stationary member, a member mounted for rotation relative to said stationary member, means connecting said member to a shaft of said engine to be driven thereby, said member having a slot, a gaseous discharge tube mounted back of the slot in said member, means mounted in part upon the engine cylinder for energizing said tube and including an electric circuit, a source of electric energy and a switch connected in said circuit, means associated with said piston and switch for operating said switch to energize said tube during travel of the piston from a predetermined position on one side of top dead-center to a corresponding position on the other side of top dead-center, and an arcuate scale mounted adjacent said tube, whereby a bright arc is produced by said tube adjacent said scale during said travel of said piston.

7. The structure defined in claim 6, in which means is provided for adjusting the operating position of the switch with respect to the position of said piston and top dead-center.

8. The structure defined in claim 5 in which the engine is equipped with a distributor having a housing, and the stationary member and its relatively rotatable member are each provided with means connecting them respectively with the housing and shaft of the distributor, whereby a bright arc indicates on the scale the angular position of the distributor shaft during travel of the piston within said predetermined distance of its uppermost position.

9. The structure defined in claim 6, in which the engine is equipped with a distributor having a housing and a removable cap, and the stationary member and its relatively rotatable member are each provided with means connecting them respectively with the housing and shaft of the distributor after the distributor cap has been removed, whereby a bright arc indicates on the scale the angular position of the distributor shaft during said travel of the piston within said predetermined distance relative to top dead-center.

BUTLER J. HASKINS.